March 11, 1952     C. B. TAFF     2,588,894
INSECT AND RODENT EXTERMINATOR
Filed Sept. 17, 1947

Inventor
Clifford B. Taff
By Clarence A. O'Brien
and Harvey B. Jacobson
Attorneys Patented Mar. 11, 1952

2,588,894

UNITED STATES PATENT OFFICE 2,588,894

INSECT AND RODENT EXTERMINATOR

Clifford B. Taff, Greenville, N. C.

Application September 17, 1947, Serial No. 774,593

5 Claims. (Cl. 43—112)

This invention relates to improvements in insect and rodent exterminators.

An object of the invention is to provide an improved insect and rodent exterminator which will comprise highly charged closely spaced metal electrodes of selected shape and form which will be interposed between the foundations and sills of buildings and extend laterally therefrom on one or both sides thereof for instantly killing and electrocuting insects and rodents when they contact or bridge the charged electrodes.

Another object of the invention is to provide an improved insect and rodent exterminator which will be disposed between building foundations and their sills including metal plates extending the full width of said foundations and beyond the lateral limits thereof, said plates supporting highly charged closely spaced electrodes of selected size and shape which are insulated one from the other and are connected to a source of electric current supply for electrocuting insects or rodents when they contact or bridge the highly charged electrodes of opposite polarity.

A further object of the invention is to provide an improved insect and rodent exterminator disposed between the foundations and sills of buildings including downwardly sloping highly charged electrodes which will combine with highly charged electrodes of opposite polarity closely spaced therefrom and connected with a suitable source of electric current supply, said exterminator being highly efficient in operation and relatively inexpensive to manufacture and produce.

Other objects will appear as the description proceeds.

In the accompanying drawings which form a part of this application,

Like characters of reference are used throughout the following specification and the accompanying drawings to designate corresponding parts.

Figure 1:
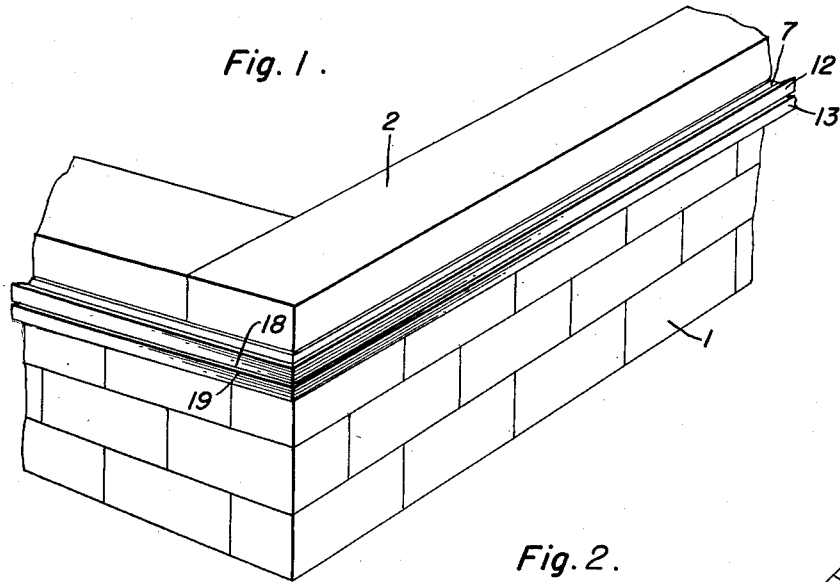
Figure 1 is a perspective view of a corner of a foundation and sill showing the present insect and rodent exterminator disposed therebetween.
Figure 2:
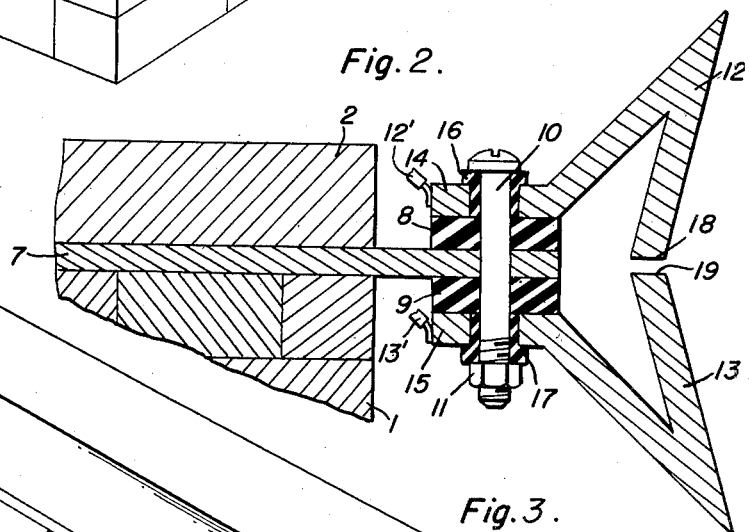
Figure 2 is an enlarged detail sectional view of the insect and rodent exterminator as shown in Figure 1.
Figure 3:
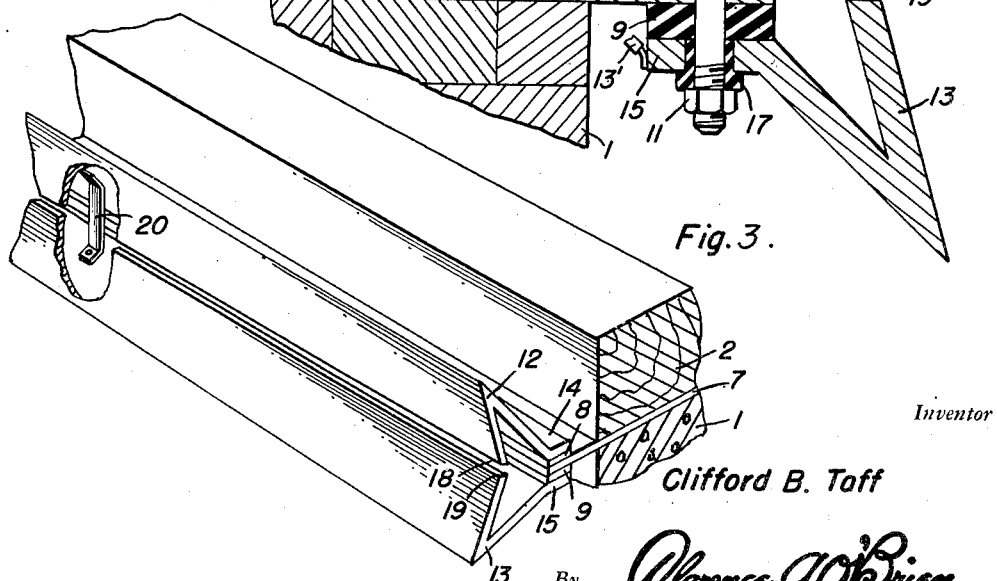
Figure 3 is a perspective view of a section of a building foundation and a superimposed sill with the oppositely disposed V-shape electrodes supported by a plate positioned between said foundation and sill, said electrodes being partly broken away and in section to show the insulated reinforcing or connecting strips secured between the same.

Referring now to the drawings in detail, wherein, for the purpose of illustration, there is disclosed a preferred embodiment of the present invention which includes a foundation 1 and sill 2 superimposed thereon. A metal plate 7 will be disposed between the foundation 1 and sill 2 and will extend outwardly beyond the outer, or outer and inner walls of the foundation. Strips of insulating material 8 and 9 will be disposed above and below the ends of the plate 7 terminating flush with the outer ends thereof, and will be held in position by the vertical bolts 10 and nuts 11 disposed thereon.

Metal V-shape electrodes 12 and 13 will be formed with flanges 14 and 15 at their inner edges for seating upon and in contact with the strips of insulating material 8 and 9 respectively. Insulating bushings 16 and 17 will extend through the flanges 14 and 15 and about the opposite ends of the bolts 10, whereby the metal electrodes 12 and 13 will be supported in fixed position to extend upwardly and downwardly at slight angles outwardly from a vertical plane. The ends 18 and 19 of the electrodes 12 and 13 will lie opposite each other and will be slightly spaced apart as clearly shown in Figures 4, 5 and 6.

A suitable electric current source (not shown) will be connected in any desired manner to the electrodes 12 and 13, as by electrical conduits 12' and 13', respectively, and bracket strips 20 of insulation material will be secured to the electrodes 12 and 13 at intervals to reinforce the same.

When insects or rodents attempt to cross the gap between the ends 18 and 19 of the electrodes 12 and 13 when charged with electric current of opposite polarity, their bodies will close an electric circuit and be instantly electrocuted.

From the foregoing description it will be apparent that there has been illustrated and described a highly efficient form of insect or rodent exterminator for disposing between building foundations and sills, the same being relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. A device of the character described including a building foundation and a sill superimposed thereon, a plate disposed therebetween and extending laterally therefrom, insulated V-shape electrodes supported by the extending end of said plate and extending respectively upwardly and outwardly, and downwardly and outwardly, and means for supplying electric current to said electrodes, and said electrodes extending in parallel spaced relation to form a gap adapted to be bridged by an insect or rodent thereby closing an electric circuit and electrocuting the insect or rodent.

2. A device of the character described including a building foundation and a sill superimposed thereon, a plate disposed therebetween and extending laterally therefrom, insulated V-shaped electrodes supported by the extending end of said plate extending respectively upwardly and outwardly, and downwardly and outwardly, means for supplying electric current to said electrodes, said electrodes extending in parallel spaced relation to form a gap adapted to be bridged by an insect or rodent thereby closing an electric circuit and electrocuting the insect or rodent, and bracing brackets of insulation connected between said electrodes.

3. In a joint construction, a pair of members, organism impervious means disposed between and connecting said members for exterminating organisms attempting to pass from one of the members to the other member, said last means including a pair of electrodes which are electrically insulated from each other and having closely spaced exposed portions for electrocuting organisms bridging such portions, whereby transit of a joint by organisms may be denied irrespective of the angular relation of the joint to the horizontal plane upon opposite polarity of said electrodes, said means including a plate between the members and extending laterally therefrom, said electrodes being V-shaped and supported by said plate, said electrodes extending in parallel spaced relation to each other and also to said members to form a gap adapted to be bridged by an organism attempting to pass from one of said members to the other member by circumventing said plate.

4. Means for preventing pests from crawling from one to another of adjoining wall sections, said means comprising a plate engaging and interposed between the wall sections and including a portion projecting laterally therefrom, electrodes spaced from the wall sections and secured to said plate portion to extend along the outer edge thereof, said electrodes being insulated from and disposed on opposite sides of the plate, and means for establishing an electric potential between the electrodes.

5. Means for preventing pests from crawling from one to another of adjoining wall sections, said means comprising a plate engaging and interposed between the wall sections and including a portion projecting laterally therefrom, electrodes spaced from the wall sections and secured to said plate portion to extend along the outer edge thereof, said electrodes being insulated from and disposed on opposite sides of the plate, said electrodes projecting beyond the outer edge of the plate and terminating in closely spaced relation, and means for establishing an electric potential between the electrodes.

CLIFFORD B. TAFF.

REFERENCES CITED

The following references are of record in the file of this patent:

UNITED STATES PATENTS

| Number | Name | Date |
|---|---|---|
| 616,049 | Archer | Dec. 13, 1898 |
| 909,814 | Norris | Jan. 12, 1909 |
| 1,062,126 | Smith | May 20, 1913 |
| 1,069,537 | Dorland | Aug. 5, 1913 |
| 1,730,608 | Frost | Oct. 8, 1929 |
| 1,871,978 | Frost | Aug. 16, 1932 |
| 2,112,229 | Davis | Mar. 29, 1938 |
| 2,196,140 | Coffman | Apr. 2, 1940 |